(12) United States Patent
Faber

(10) Patent No.: US 11,426,910 B2
(45) Date of Patent: Aug. 30, 2022

(54) INKPAD HOLDER AND DEVICE AND METHOD FOR PRODUCING THE SAME

(71) Applicant: COLOP STEMPELERZEUGUNG SKOPEK GESELLSCHAFT M.B.H & CO. KG., Wels (AT)

(72) Inventor: Ernst Faber, Wels (AT)

(73) Assignee: COLOP STEMPELERZEUGUNG SKOPEK GESELLSCHAFT M.B.H & CO. KG., Wels (AT)

( * ) Notice: Subject to any disclaimer, the term of this patent is extended or adjusted under 35 U.S.C. 154(b) by 512 days.

(21) Appl. No.: 16/038,469

(22) Filed: Jul. 18, 2018

(65) Prior Publication Data

US 2018/0333907 A1 Nov. 22, 2018

Related U.S. Application Data

(63) Continuation of application No. 14/786,015, filed as application No. PCT/AT2014/050099 on Apr. 22, 2014, now abandoned.

(30) Foreign Application Priority Data

Apr. 22, 2013 (AT) .............................. A 50271/2013

(51) Int. Cl.
| | |
|---|---|
| *B29C 45/66* | (2006.01) |
| *B29C 45/44* | (2006.01) |
| *B41K 1/40* | (2006.01) |
| *B41K 1/54* | (2006.01) |
| *B29C 45/40* | (2006.01) |

(Continued)

(52) U.S. Cl.
CPC ............ *B29C 45/66* (2013.01); *B29C 45/401* (2013.01); *B29C 45/4421* (2013.01); *B41K 1/40* (2013.01); *B41K 1/54* (2013.01); *B29K 2101/00* (2013.01); *B29L 2031/7678* (2013.01)

(58) Field of Classification Search
None
See application file for complete search history.

(56) References Cited

U.S. PATENT DOCUMENTS

| | | |
|---|---|---|
| 454,499 A | 6/1891 | Ryer |
| 2,374,198 A | 4/1945 | Harris |
| 2,559,861 A | 7/1951 | Fay |

(Continued)

FOREIGN PATENT DOCUMENTS

| | | |
|---|---|---|
| AT | 411 976 B | 8/2004 |
| AT | 503 424 B1 | 10/2007 |

(Continued)

OTHER PUBLICATIONS

International Search Report of PCT/AT2014/050099, dated Jan. 7, 2015.

(Continued)

*Primary Examiner* — Mohammad M Ameen
(74) *Attorney, Agent, or Firm* — Collard & Roe, P.C.

(57) ABSTRACT

An inkpad holder for arrangement in an insertion compartment of a self-inking stamp includes a one-piece body having a bottom and walls projecting therefrom which delimit a receiving space for receiving an inkpad. At least one wall of the inkpad holder has a retaining web protruding into the receiving space in order to retain the inkpad, the retaining web extending over the entire length of the wall.

8 Claims, 5 Drawing Sheets

(51) Int. Cl.
  *B29K 101/00* (2006.01)
  *B29L 31/00* (2006.01)

(56) References Cited

U.S. PATENT DOCUMENTS

| | | | |
|---|---|---|---|
| 2,678,626 A | | 5/1954 | Garvey |
| 3,865,529 A | | 2/1975 | Guzzo |
| 3,966,385 A | | 6/1976 | Spears |
| 4,019,711 A | | 4/1977 | Altenhof et al. |
| 4,846,661 A | | 7/1989 | Nakamura et al. |
| 5,850,787 A | | 12/1998 | Pichler |
| 5,925,303 A | * | 7/1999 | Scheliga ............... B29C 45/40 |
| | | | 264/318 |
| 6,354,560 B1 | | 3/2002 | Kawasaki et al. |
| 6,761,114 B2 | | 7/2004 | Koneczny et al. |
| 6,813,999 B2 | | 11/2004 | Treml |
| 7,069,852 B2 | | 7/2006 | Zindl et al. |
| 7,380,497 B2 | | 6/2008 | Faber |
| 2005/0145127 A1 | * | 7/2005 | Zindl ...................... B41K 1/40 |
| | | | 101/333 |
| 2007/0054007 A1 | | 3/2007 | Yamaura et al. |

FOREIGN PATENT DOCUMENTS

| | | |
|---|---|---|
| CN | 1263003 A | 8/2000 |
| CN | 101279497 A | 10/2008 |
| DE | 634393 C | 8/1936 |
| DE | 1 244 379 B | 7/1967 |
| DE | 2 040 196 A1 | 2/1972 |
| DE | 2 135 360 A1 | 1/1973 |
| DE | 2 308 359 A1 | 9/1974 |
| DE | 2 309 704 A1 | 9/1974 |
| DE | 696 00 791 T2 | 6/1999 |
| DE | 20 2004 018 103 U1 | 1/2005 |
| DE | 202004018103 U * | 1/2005 |
| EP | 1 603 755 B1 | 8/2007 |
| EP | 1 977 875 A1 | 10/2008 |
| FR | 472299 A | 11/1914 |
| GB | 757876 A | 9/1956 |
| GB | 1 418 621 A | 12/1975 |
| JP | 2000-94479 A | 4/2000 |
| WO | 96/16816 A1 | 6/1996 |
| WO | 01/83227 A1 | 11/2001 |
| WO | 2006/076754 A2 | 7/2006 |

OTHER PUBLICATIONS

Chinese Office Action in CN 201480029868.2, dated Aug. 3, 2016, with English translation.
Austrian Office Action dated Apr. 11, 2014 in Austrian Patent Application A50271/2013 with translation.
Request for International Preliminary Examination dated Apr. 7, 2015 in PCT/AT2014/50099 with translation of relevant parts.
International Preliminary Report on Patentability dated Jul. 9, 2015 in PCT/AT2014/50099 with translation.

* cited by examiner

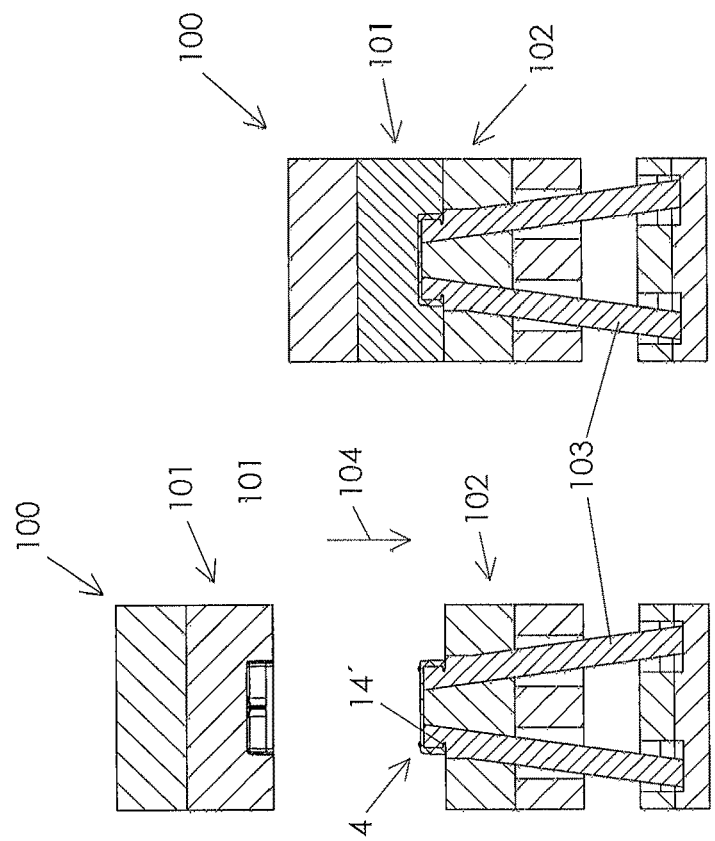
Fig. 2b
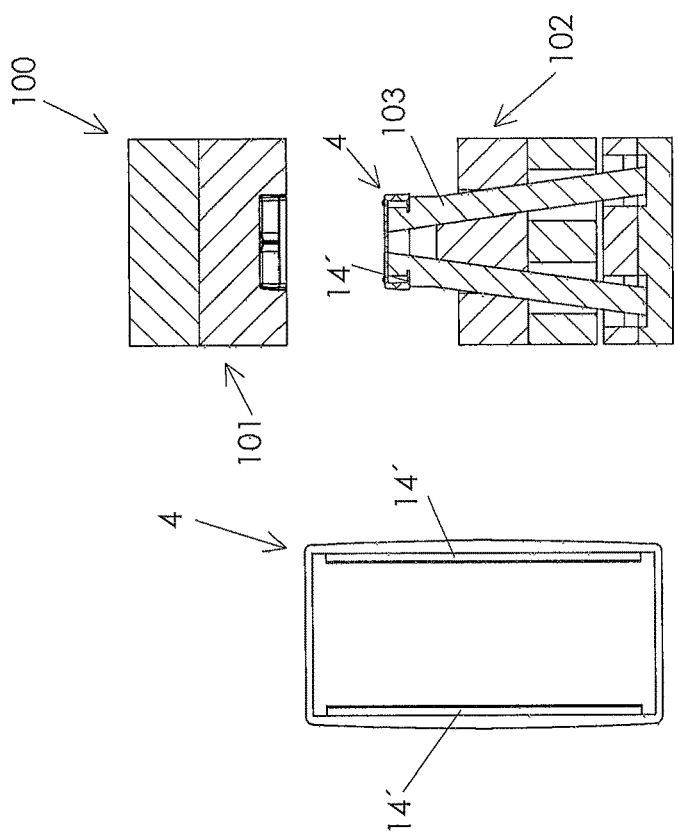
Fig. 2c
Fig. 2d
Fig 2a

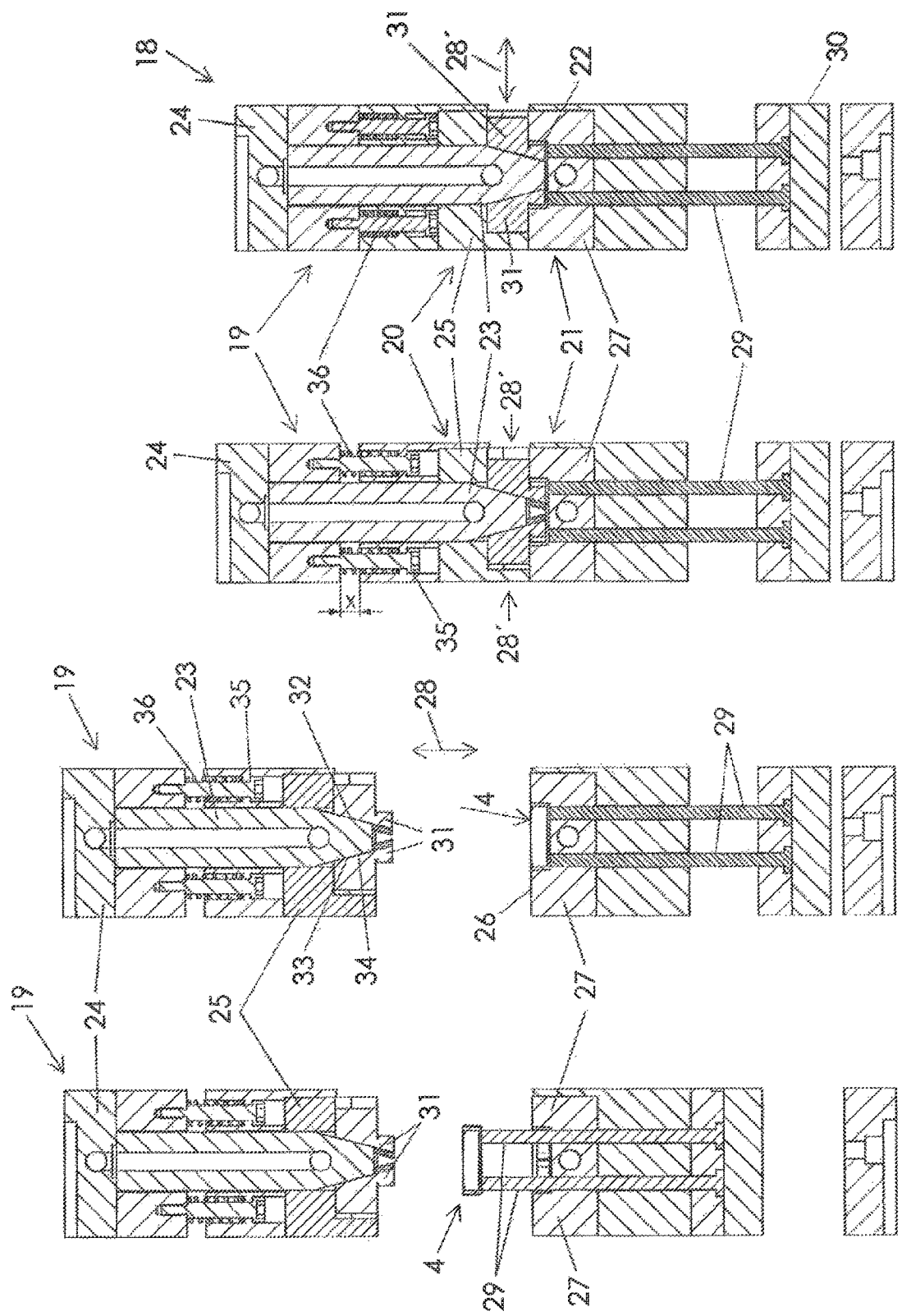

INKPAD HOLDER AND DEVICE AND METHOD FOR PRODUCING THE SAME

CROSS REFERENCE TO RELATED APPLICATIONS

This application is a continuation of and Applicant claims priority under 35 U.S.C. § 120 of parent U.S. application Ser. No. 14/786,015 filed Oct. 21, 2015, which application is a National Stage application under 35 U.S.C. § 371 of PCT/AT2014/050099 filed on Apr. 22, 2014, which claims priority under 35 U.S.C. § 119 of Austrian Application No. A 50271/2013 filed on Apr. 22, 2013, the disclosures of each of which are hereby incorporated by reference. The international application under PCT article 21(2) was not published in English. A certified copy of Austrian priority application No. A 50271/2013 is contained in parent U.S. application Ser. No. 14/786,016.

FIELD OF THE INVENTION

The invention relates to an inkpad holder for arrangement in an insertion compartment of a self-inking stamp, having a bottom and walls projecting therefrom which delimit a receiving space for receiving an inkpad, at least one wall of the inkpad holder comprising a retaining web protruding into the receiving space in order to retain the inkpad.

Furthermore, the invention relates to a device for injection moulding such an inkpad holder, having an injection mould tool comprising a first and a second tool part, which injection mould tool encloses a mould cavity in a closing position, the first and second tool parts being movably supported relative to one another in an opening or closing direction.

Finally, the invention relates to a method for producing such an inkpad holder in an injection moulding process.

DESCRIPTION OF THE RELATED ART

A self-inking stamp in which an inkpad holder is inserted like a drawer in an insertion compartment of the stamp housing is known e.g. from EP 1 603 755 B1. Upon completion of the stamping ink in the inkpad, the inkpad container can be removed from the insertion compartment and replaced by a new inkpad container or the original inkpad container with refilled inkpad. For this purpose, the insertion compartment comprises a freely accessible insertion opening on at least one side. In this prior art, the inkpad is glued into the inkpad holder. As a disadvantage, when producing the inkpad in a punching operation this may result in the formation of threads in the corners. When inserting into the stamp, the threads impregnated with ink may soil the insertion compartment. In addition, this technique has the disadvantage that bulging of the inkpad insert, especially on the longitudinal sides, complicates handling of the inkpad holder or leads to contaminations on the stamp or on the part of a user.

In addition, from AT 411 976 B a self-inking stamp has been known, in which a replaceable inkpad container comprises inwardly protruding ledge projections on the bottom side.

However, for manufacturing reasons, it was necessary in such inkpad containers that the ledge projections extend along the inkpad container only in portions. Therefore, this could not solve the problem that the inkpad can lead to contamination of the stamp due to bulging and the formation of threads on the corner zones. In addition, handling the inkpad holder called for the user's skill in order to avoid any contaminations during replacement operations.

SUMMARY OF THE INVENTION

Accordingly, it is the object of the present invention to obviate or reduce the disadvantages of the prior art. Therefore, an inkpad holder of the above given type is to be provided, by which the inkpad is reliably held in the intended position within the receiving space. In addition, a simplified method and a device for the manufacture of such an inkpad holder shall be indicated.

For solving this object the inkpad holder of the above given kind is characterized in that the retaining web extends over the entire length of the wall.

This design has the advantage that the retaining web extends into the corner zones of the inkpad holder. Thus, it may be ensured in a reliable manner that any formation of threads or any bulging of the inkpad does not lead to any protrusion of the inkpad on the upper side of the inkpad holder.

To fix the inkpad within the inkpad holder, it is favourable if the retaining web is provided on an edge portion of the wall, the edge portion facing away from the bottom. During assembly, the inkpad is pressed below the retaining web projecting to the inside on the upper edge portion of the wall, the inkpad being fixed thereby in the receiving space.

When the retaining web is arranged to be essentially perpendicular to the wall, the inkpad holder can advantageously have the same overall height as conventional embodiments without any retaining web. In addition, this may ensure a safer hold of the inkpad in the receiving space.

To reliably prevent that when in use the inkpad will come loose of the intended position and project over the access opening of the inkpad holder or the inkpad even come off the inkpad holder, it is of advantage if the wall is provided with the retaining web on a longitudinal side of the inkpad holder. In this embodiment, the inkpad holder therefore comprises longitudinal sides and narrow sides, the retaining web being provided on one of the longitudinal sides. For the arrangement in the insertion compartments of commercially available self-inking stamps, the inkpad holder preferably comprises an essentially rectangular bottom, on the longitudinal or transverse edges of which the walls are angled. Adapting the retaining web on a longitudinal side of the inkpad holder ensures that the inkpad is sufficiently pressed toward the bottom of the inkpad holder in order to hold the inkpad in the intended position.

The fixation of the inkpad in the inkpad holder may further be reinforced if at least two walls comprise retaining webs preferably on the longitudinal sides. In accordance with a preferred embodiment, the inkpad holder only comprises retaining webs on the two longitudinal sides but not on the narrow sides. On the other hand, it may also be provided that the inkpad holder comprises retaining webs on both the longitudinal and the narrow sides.

For one thing, to ensure sufficient retention of the inkpad in the inkpad holder in the assembled state, and for the other, to not excessively complicate assembly of the inkpad by pressing it in the receiving space, it is advantageous if the retaining web is 0.8 to 2.5 mm, in particular 0.9 to 1.3 mm, preferably substantially 1 mm in width. In this context, the width relates to the extension of the retaining web away from the pertinent wall of the inkpad holder.

For manufacturing reasons, it is preferred that the retaining web be integral with the wall.

It is also convenient in this embodiment if the bottom, the walls and the at least one retaining web are designed integrally, in particular as injection moulding part.

Moreover, the object of the invention is obtained by a device of the above mentioned kind, in which the injection mould tool comprises at least one slide part extending over the entire length of the mould cavity, which slide part is movably arranged between an injection position engaging behind the retaining web of the inkpad holder and a separating position releasing the retaining web in a direction deviating from the opening or closing direction of the tool parts.

Therefore, for injection moulding the inkpad holder first the injection mould tool is arranged in the closing position, in which the shape of the inkpad holder is formed by the mould cavity. By injecting a starting material in plasticized condition the inkpad holder is formed in the mould cavity. In injection moulding, the slide part is arranged in the injection position, in which the slide part is arranged in portions below an area of the mould cavity forming the retaining web. The slide part is preferably arranged in the injection position such that the slide part leaves an area of the mould cavity blank, the area being essentially U-shaped in cross-section, to form the wall with the retaining web and the edge portion of the bottom. By transferring the slide part transverse to the closing or opening direction of the injection mould tool and away from the wall of the inkpad holder, which comprises the retaining web, to the separating position the slide part can be detached from the engagement with the retaining web, so that upon termination of the injection moulding process the injection mould tool can be opened in an opening direction to remove the finished inkpad holder from the injection mould tool. The slide part is movable at least over the width of the retaining web in order to be transferred into the separating position, a safety distance exceeding the width of the retaining web being preferably covered in order to reliably prevent the injection mould tool from being blocked by the slide part when separating the tool parts in the opening direction.

It is particularly preferable if at least one ejector for removing the inkpad holder from the mould cavity is provided on one of the tool parts, the at least one slide part being different from the ejector. Accordingly, separate components are provided as slide part and ejector, so that movement of the slide part for the release of the retaining web of the inkpad holder can be effected independently of removing the inkpad holder from the mould cavity. Said embodiment has the advantage of that the inkpad holder is present in the mould cavity in a fixed manner, if the at least one slide part is moved away from the longitudinal side of the mould cavity for the demoulding process. Thus, it is prevented that the inkpad holder sticks to one of the slide parts and is carried along by this slide part. In known injection mould tools, this could be prevented only in that the corner zones of the inkpad holder are kept clear by the retaining webs and thus contribute to the centering of the inkpad holder. In contrast, in the present application, first the retaining web is released by means of actuating the slide part, next the mould cavity is opened, and finally the inkpad holder is removed from the mould cavity by means of actuating the ejector.

For forming a retaining web which is arranged essentially perpendicularly to the wall it is favourable if the slide part is movably arranged in a manner essentially perpendicular to the opening or closing direction of the tool parts. Upon completion of the injection process, first of all the slide part is moved essentially perpendicularly to the opening direction until the slide part is released from engagement with the retaining web, before the injection mould tool can be opened by a relative movement between the tool parts.

For forming two retaining webs on opposite sides of the inkpad holder it is advantageous if two slide parts are movably arranged in opposite directions.

Accordingly, upon completion of the injection process the two slide parts are movable in opposite directions for releasing the retaining webs, with the movement of the one slide part preferably being coupled to that of the other slide part.

According to an especially preferred embodiment it is provided that the first tool part and the second tool part are jointly slidable between the injection position and the separating position by a predetermined distance in the opening or closing direction, the injection mould tool comprising corresponding guide means, by which the joint shifting of the tool parts in the opening or closing direction can be converted into the movement of the slide part between the injection position and separating position. Accordingly, shifting the tool parts along the predetermined distance in the opening direction is coupled to the movement of the slide part into the separating position.

To move the slide part in accordance with the joint shift of the tool parts along the predetermined distance into the separating position, it is advantages if the guide means comprise guide surfaces arranged diagonally to the opening or closing direction, in particular at an angle between 6° and 20°. The inclination of the guide surfaces can determine the translation between the shift of the tool parts and the movement of the slide part.

In this connection, it is advantageous if the one guide surface is provided on the slide part and the other guide surface is preferably formed on the front end of an injection nozzle. The front end of the injection nozzle preferably converges in a conical manner. In the transfer between the injection position and the separating position the guide surfaces of the slide part and the injection nozzle slide alongside each other.

It is provided in a preferred embodiment that the guide means comprise a spring or traction force element causing the slide part to be moved into the separating position. In particular, spring elements or core pullers may be provided to shift the slide part into the separating position.

According to a preferred embodiment, the injection mould tool comprises a stop for limiting the shift of the first tool part in the opening direction, in which context the second tool part for separating the tool parts is movable relative to the first tool part which has been shifted into the stop position. Accordingly, the injection mould tool can be moved from the closing position for injection moulding of the inkpad holder in the opening direction via the stop position of the first tool part, which corresponds to the separating or releasing position of the slide part, into the open position for the removal of the inkpad holder. Advantageously, demoulding can be achieved thereby in a single movement process.

To carry the first tool part along over the predetermined distance in the direction of the open position, if the second tool part is being shifted into the open position, it is preferably provided that the first tool part is connected to a spring element, which biases the first tool part in the direction of the stop position corresponding to the separating position. Having reached the stop position of the first tool part, the second tool part can be shifted into the open position, with the first tool part being stationary.

For opening the injection mould tool it is favourable that the second tool part is connected to a drive, in particular a hydraulic drive.

Finally, the object on which the present invention is based is obtained by a method in which the retaining web is engaged behind in an injection position by a slide part extending over the entire length of the wall, which slide part is then shifted to a separating position releasing the retaining web.

As regards the advantages and technical effects of such a method, reference is made to the above statements.

BRIEF DESCRIPTION OF THE DRAWINGS

Hereinafter, the invention will be described in detail with reference to preferred embodiments shown in the drawings, but not limited thereto, in which:

FIG. 2a shows a view of an inkpad holder, in which support projections are provided on the longitudinal sides, which however do not extend up to the corner zones;

FIGS. 2b to 2d show views of an injection mould tool in various production phases of the known inkpad holder;

FIG. 3b shows a section along the line IIIb-IIIb in FIG. 3a;

FIG. 3c shows a section along the line IIIc-IIIc in FIG. 3a;

FIG. 4b shows a section along the line IVb-IVb in FIG. 4a; and

FIG. 4c shows a section along the line IVc-IVc in FIG. 4a;

FIGS. 5 to 8 show views of a device according to the invention for producing the inkpad holder according to FIGS. 3 to 5, comprising an injection mould tool which can be transferred between an injection position in injecting the inkpad holder (FIG. 5), a separating position (FIG. 6) releasing the retaining web of the finished inkpad holder, an open position (FIG. 7) and an eject position (FIG. 8).

DETAILED DESCRIPTION OF THE DRAWINGS

Figure 1:
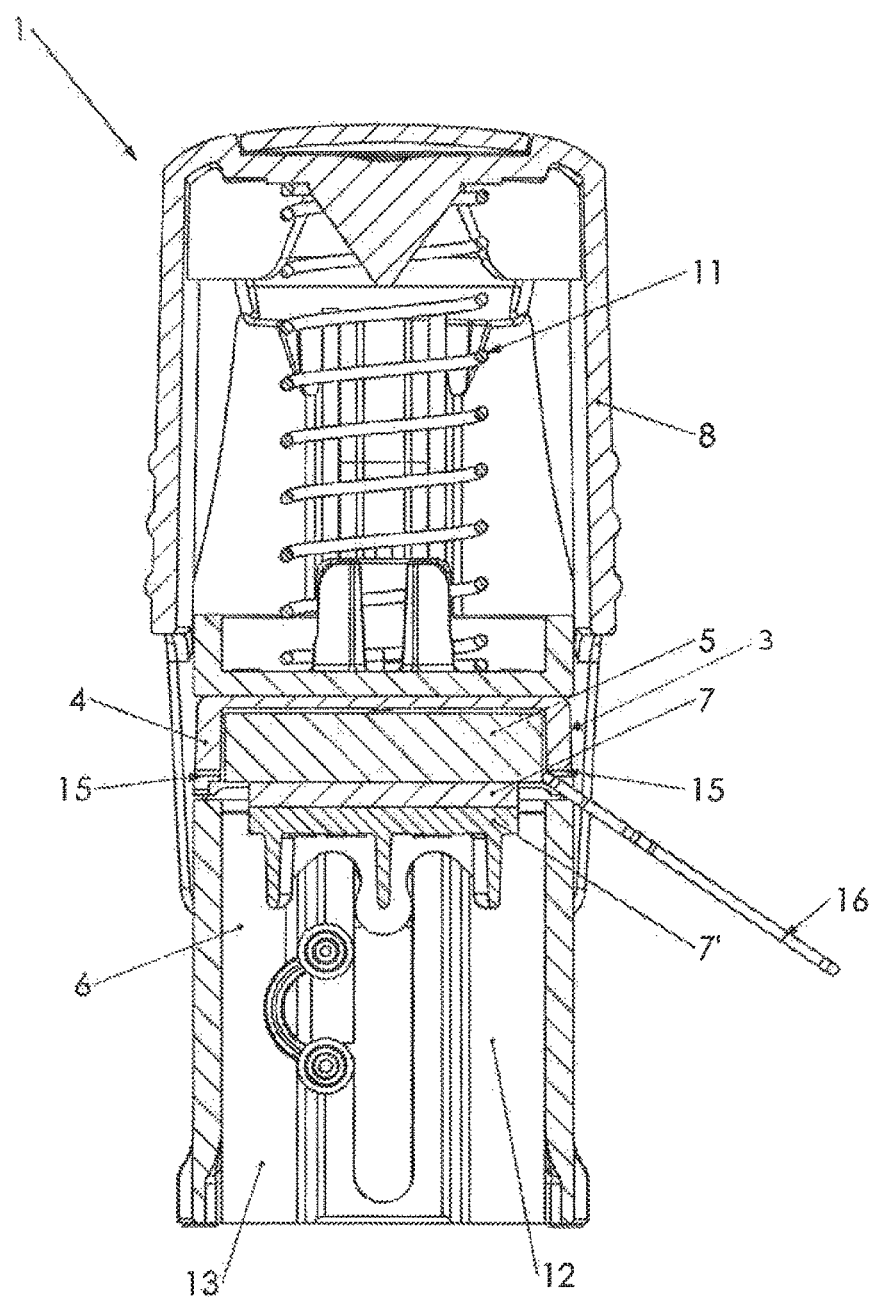
FIG. 1 shows as sectional view of a self-inking stamp, in which a conventional inkpad holder is arranged in an insertion compartment.
Figure 3A:
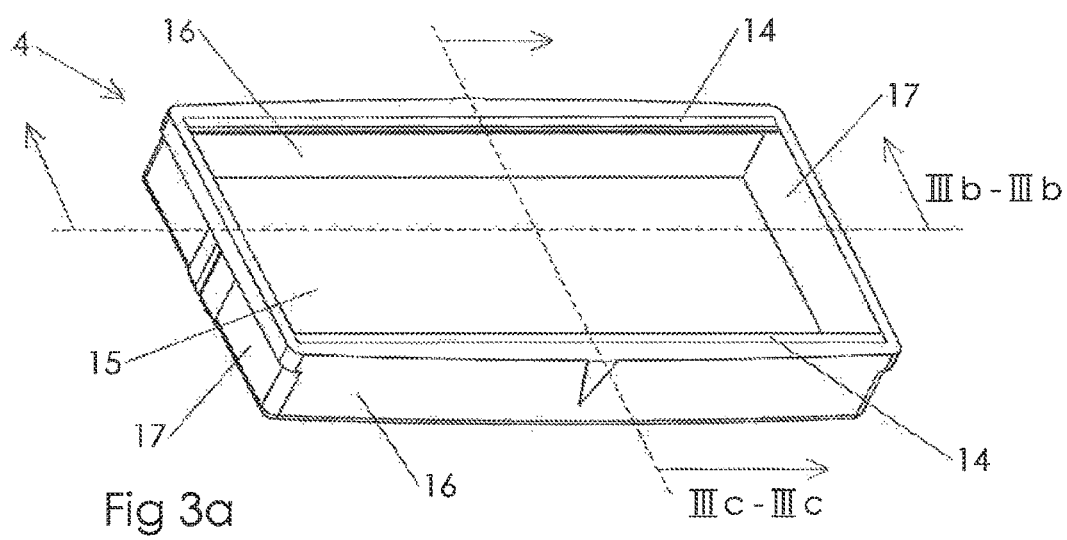
FIG. 3a shows a perspective view of an inkpad holder according to the invention, in which retaining webs on the longitudinal sides extend along the entire length of the inkpad holder.
Figure 3B:
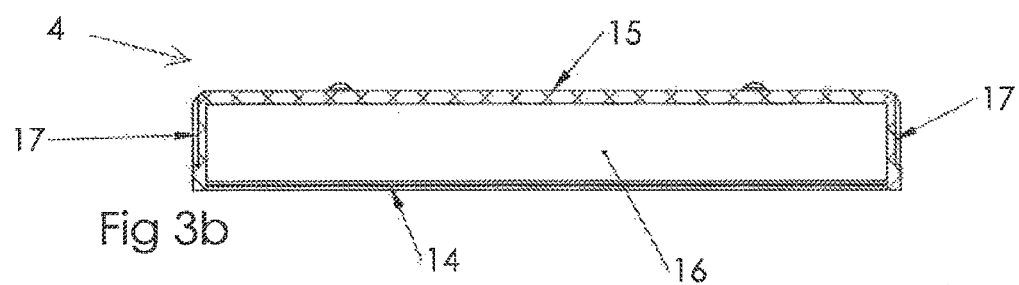
Figure 3D:
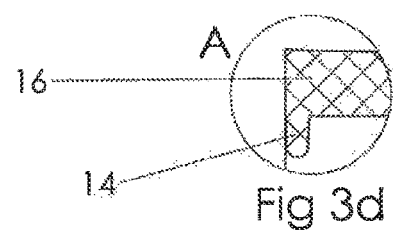
FIG. 3d shows an enlarged view of detail A according to FIG. 3c.
Figure 3C:
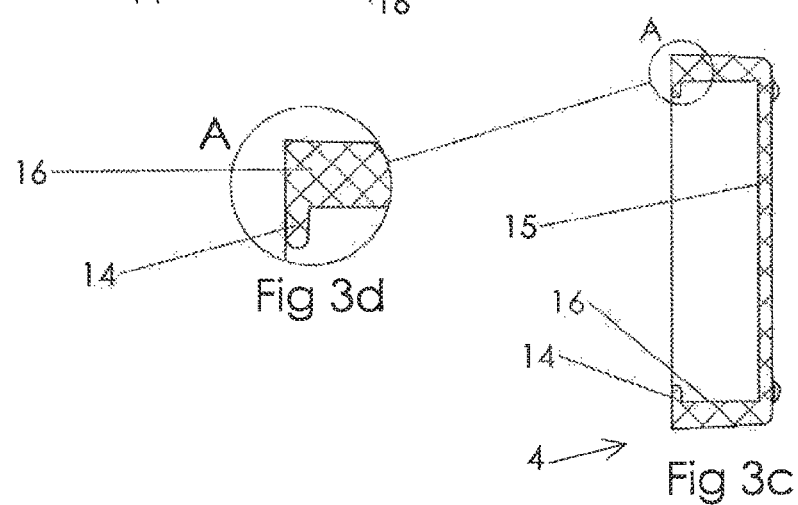

FIG. 1 shows a conventional self-inking stamp 1 comprising a frame-shaped stamp housing 2 (hereinafter called housing 2). The housing 2 comprises an insertion compartment 3 for an inkpad holder 4 arranged therein for replacement, in which an inkpad 5 is received. According to FIG. 1, a paper clip 16 is used for the replacement of the inkpad holder 4, which paper clip engages with a recess 15 of the inkpad holder 4. Alternatively, the insertion compartment 3 may be open to both sides, so that the inkpad holder 4 can be pressed out of the insertion compartment 3 without any recess 15. Furthermore, a stamp unit 6 is arranged inside the housing 2, which comprises a stamp plate 7 which includes stamp types and is arranged on a stamp plate carrier 7'. In FIG. 1 the stamp unit 6 is shown in an inking position adjacent to the inkpad 5.

For actuating the self-inking stamp 1 an actuating arm 8 is provided, which is placed on the housing 2 like a hood in the shown example. The actuating arm 8 comprises legs (not shown) on the narrow sides, which are inserted in suitable guides on the narrow side walls of the housing 2 and guided therein in a slidable manner. A spring 11 acts between the actuating arm 8 and the housing 2, which holds the actuating arm 8 in its upper position shown and thus the stamp unit 6 in the inking position. The shift of the actuating arm 8 into its lower end or actuating position is transmitted via a turning mechanism 12 in a manner known per se, which mechanism causes the stamp unit 6 to be swivelled from the shown inking position and into a printing position provided for printing a printing surface as well as at the same time a descending movement. In the printing position, the stamp plate 7 projects with the stamp types through a bottom aperture 13 of the housing 2, so that a printing can be made on a printing surface. For example the turning mechanism 12 comprises a curve control or slot guidance known in the prior art, so as to turn the stamp unit 6 into the printing position by 180° upon actuation of the actuating arm 8. These or similar turning mechanisms are well known in the prior art, so that no further explanation is needed.

According to FIG. 1 the inkpad 5 is held by means of an adhesive joint in the inkpad holder 4.

In addition, an inkpad holder 4 according to FIG. 2a has been known, in which support projections 14' are provided on the longitudinal sides, by means of which the inkpad 5 should be fixed in the inkpad holder 4. For manufacturing reasons, however, it was provided that the support projections 14' do not extend into the corner zones of the inkpad holder 4.

FIGS. 2b to 2d schematically illustrate the production of the known inkpad holder 4 in an injection mould tool 100 comprising a first tool part 101 and a second tool part 102. According to FIG. 2b the injection mould tool is arranged in a closing position enclosing a mould cavity, in which closing position the inkpad holder 4 is produced by injection moulding. The second tool part 102 of the injection mould tool 100 comprises two ejectors 103 whose front ends engage behind the free spaces for the support projections 14' during the injection moulding process. Upon completion of the injection process the second tool part 102 is moved away from the first tool part 101 in the opening direction 104 (cf. FIG. 2c). Subsequently, the ejectors 103 are shifted into the opening direction (cf. FIG. 2d). Due to the transverse position of the ejectors 103 relative to the opening direction 104 the front ends of the ejectors 103 are shifted to the inside upon opening of the injection mould tool 100, thus releasing the support projections 14'. Accordingly, demoulding takes place only upon the ejection of the inkpad holder 4. On the one hand, this method is complex. On the other hand, it is absolutely necessary that the support projections 14' leave the corner zones of the inkpad holder 4 blank, since these fixed corners center the inkpad during demoulding and prevent shifting up to one of the two ejectors 103. If in such an embodiment such corners were omitted, the pad holder might stick to one of the two opposed ejectors 103 and consequently demoulding could fail.

FIG. 3 shows an inkpad holder 4 which, just like the known embodiment according to FIG. 2, comprises a bottom 15 including walls 16 and 17 protruding therefrom on the longitudinal or narrow sides. According to FIG. 3 two retaining webs 14 extend over the entire length of the opposite longitudinal walls 16 of the inkpad holder 4.

From FIG. 3 it can also be seen that the retaining webs 14 are arranged at an angle substantially perpendicularly from the border areas of walls 16 on the longitudinal side facing away from the bottom 15. In the embodiment according to FIG. 3, only the walls 16 on the longitudinal side comprise the retaining webs 14, with the walls 17 on the narrow side not containing any retaining webs 14. The retaining webs 14 have a width of substantially 1 mm. The inkpad holder 4 is preferably formed by an injection-moulded part comprising the bottom 15, the walls 16, 17, and the retaining webs 14.

Figure 4A:
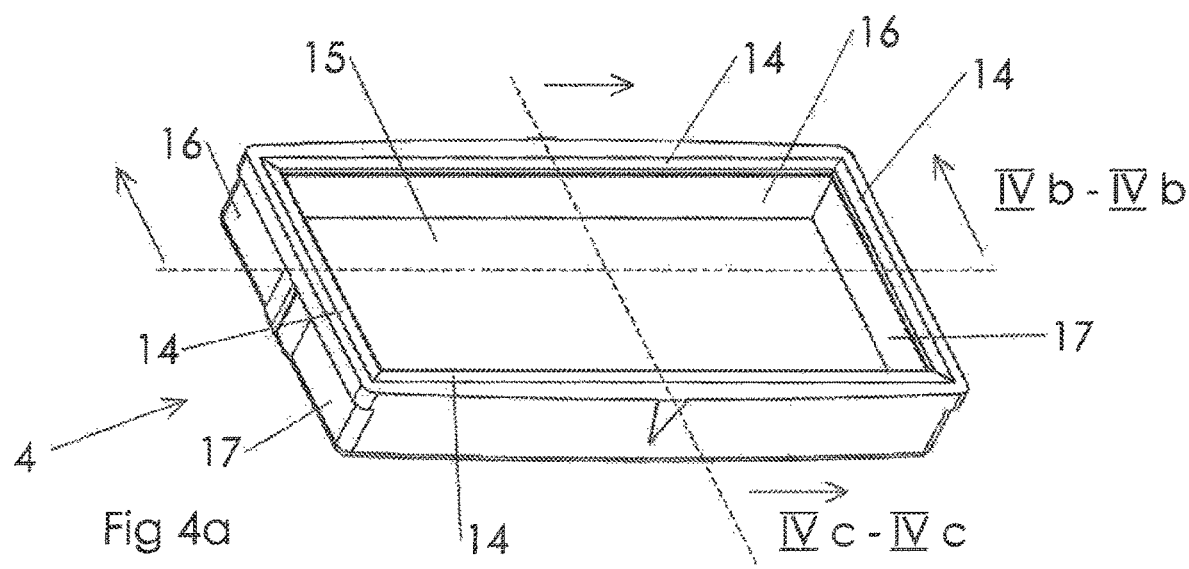
FIG. 4a shows a perspective view of another embodiment of the inkpad holder according to the invention, in which retaining webs are present on the longitudinal and narrow sides.
Figure 4B:
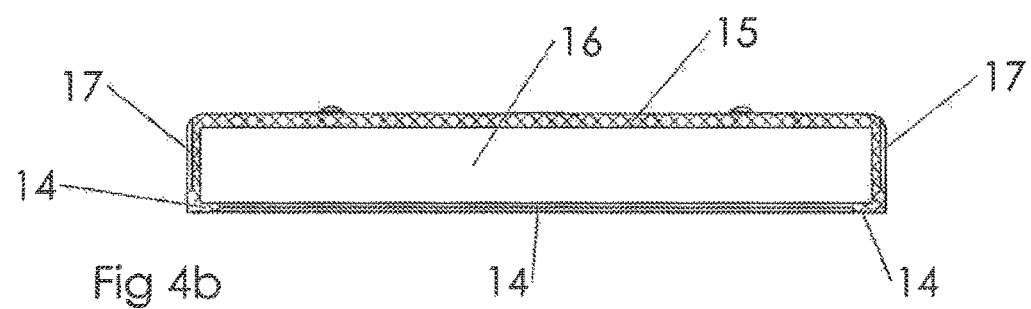
Figure 4C:
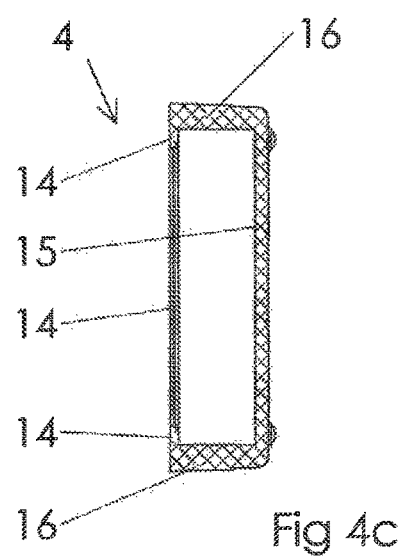

The embodiment according to FIG. 4 therefore differs from the one of FIG. 3 in that the inkpad holder 4 additionally comprises retaining webs 14 on the narrow sides of the inkpad holder 4. Thus, according to FIG. 4 a total of four retaining webs is provided, which are extending along the access opening in the receiving space for the inkpad 5 without any interruptions.

The manufacture of the inkpad holder 4 illustrated in FIG. 3 will be illustrated hereinafter with reference to FIGS. 5 to 8.

FIG. 5 schematically shows a device 18 for the injection moulding of the inkpad holder 4 by means of an injection mould tool 19 comprising a first tool part 20 and a second tool part 21. According to FIG. 5 the injection mould tool 19 is arranged in a closing position, in which the tool parts 20, 21 enclose a mould cavity 22 representing the inkpad holder 4. The device 18 further comprises an injection nozzle 23 which is supported in a mounting plate 24 in a known manner. A plastic material can be fed in the mould cavity 22 in plasticized condition with the aid of the injection nozzle 23. The first tool part 20 further comprises a mould plate 25 determining the mould cavity 22 together with a mould plate 27 of the second tool part 21. The second tool part 21 is connected to a drive (not shown), with which the second tool part 21 is movable in opening or closing direction (cf. arrows 28) relative to the first tool part 20. Moreover, the second tool part 21 comprises two ejectors 29 for ejecting the finished inkpad holder 4. The ejectors 29 are supported on a front plate 30, which is movable against the mould plate 27 of the second tool part 21, to remove the inkpad holder 4 from the mould cavity 22 (cf. FIG. 8).

As may be further seen from FIG. 5, the injection mould tool 19 additionally comprises two slide parts 31 extending perpendicularly to the figure plane over the entire length of the mould cavity 22, so that the retaining webs 14 can be produced along the walls 16 of the inkpad holder 4. According to FIG. 5 the slide parts 31 are arranged in an injection position when injecting the inkpad holder 4, the slide parts 31 engaging behind the opposite retaining webs 14 of the inkpad holder 4 (or prior to injecting the plastic material engaging behind the corresponding free spaces of the mould cavity 22). The slide parts 31 are arranged on the first tool part 20, the inkpad holder 4 being formed in the second tool part 21. In the injection position shown in FIG. 5 the injection mould tool 19 might not be opened, since the retaining webs 14 would block a relative movement between the mould plate 25 of the first tool part 20 and the mould plate 27 of the second tool part 21 along the main separating plane 26.

As shown in FIG. 6, the slide parts 31 can be transferred from the injection position according to FIG. 5 to a direction perpendicular to the opening or closing direction 28 or away from the walls 16 of the inkpad holder 4, which walls 16 comprise the retaining webs 14, into a separating position releasing the retaining webs 14 (cf. arrows 28' in FIGS. 5 and 6), which makes it possible to open the injection mould tool 19 to remove the inkpad holder 4.

Further, as can be seen from FIG. 6, the first tool part 20 and the second tool part are jointly shiftable between the injection position (FIG. 5) and the separating position (FIG. 6) in the opening or closing direction 28 by a predetermined distance x. The injection mould tool 19 comprises guide means 32 (cf. FIG. 7) to transmit the joint shift of the tool parts 20, 21 along the distance x in the transverse movement of the slide parts 31 from the injection position according to FIG. 5 to the separating position according to FIG. 6. The guide means 32 comprise guide surfaces 33, 34 arranged transversely to the opening or closing direction 28, for example, at an angle of 15°. In the shown embodiment, the one guide surfaces 33 are provided on the slide parts 31, the other guide surfaces 34 are formed on the conically converging front end of the injection nozzle 23. In addition, the guide means 32 comprise a spring or traction force element (not shown) causing the movement of the slide parts 31 along the guide surfaces 33, 34 into the separating position.

To limit the shift of the first tool part 20 to the distance x, the injection mould tool 19 further comprises a stop 35, so that the second tool part 21 can be moved on by itself in the direction of the open position (FIG. 7) upon reaching the stop position of the first tool part 20 corresponding to the separating position of the slide parts 31. In addition, the first tool part 20 is connected to a spring means 36 biasing the first tool part 20 in opening direction, so that the first tool part 20 is carried along, if the second tool part 21 is moved in the direction of the open position.

Finally, the ejectors 29—cf. FIG. 8—can be actuated to remove the inkpad holder 4 from the injection mould tool 19.

It becomes clear from the above example that the inkpad holder 4 according to FIG. 3 or FIG. 4 can be produced by a method in which the retaining web 14 is engaged behind in an injection position by a slide part 31 extending over the entire length of the pertinent wall 16, which slide part 31 is subsequently shifted into a separating position releasing the retaining web 14.

What is claimed is:

1. An inkpad holder for arrangement in an insertion compartment of a self-inking stamp, comprising:
 a one-piece body, having:
 a bottom;
 walls; and
 two retaining webs,
 wherein the walls are projecting from the bottom,
 wherein the walls delimit a receiving space for receiving an inkpad,
 wherein the bottom and therefore the inkpad holder comprises a rectangular shape with two longitudinal sides and two transverse sides,
 wherein each retaining web protrudes from a different one of the two walls on the longitudinal sides of the inkpad holder into the receiving space in order to retain the inkpad,
 wherein each retaining web extends over the entire length of said one of the two walls on the longitudinal sides, and
 wherein the two walls on the transverse sides of the inkpad holder are free from additional webs.

2. The inkpad holder according to claim 1, wherein each retaining web is provided on an edge portion of the wall, the edge portion facing away from the bottom.

3. The inkpad holder according to claim 1, wherein each retaining web is arranged essentially to be perpendicular to the wall.

4. The inkpad holder according to claim 1, wherein each retaining web has a width of between 0.8 mm and 2.5 mm.

5. The inkpad holder according to claim 1, wherein each retaining web has a width of between 0.9 mm and 1.3 mm.

6. The inkpad holder according to claim 1, wherein each retaining web has a width of essentially 1 mm.

7. The inkpad holder according to claim 1, wherein each retaining web is designed as one piece with the wall.

8. A self-inking stamp having an insertion compartment, comprising: an inkpad holder according to claim 1 arranged in the insertion compartment.

* * * * *